United States Patent
Pilkington

[15] 3,643,108
[45] Feb. 15, 1972

[54] AUTOMATIC PROCESS CONTROL SYSTEMS

[72] Inventor: Stephen John Pilkington, Lancaster, England

[73] Assignee: SK Instruments Limited, Skelmersdale, England

[22] Filed: Oct. 13, 1969

[21] Appl. No.: 865,927

[30] Foreign Application Priority Data
Jan. 8, 1969 Great Britain..........................1,089/69

[52] U.S. Cl...............................307/230, 307/235, 307/237, 307/310, 331/113, 330/30 D, 328/142, 328/147
[51] Int. Cl. ..........................................................G06g 7/12
[58] Field of Search .................328/155, 142, 147; 307/310, 307/230, 235, 237; 330/30 D; 331/113

[56] References Cited

UNITED STATES PATENTS

| | | | |
|---|---|---|---|
| 3,281,073 | 10/1966 | Chou et al. | 307/310 X |
| 3,337,814 | 8/1967 | Brase et al. | 328/155 X |
| 3,344,283 | 9/1967 | Stubbs | 307/310 X |

*Primary Examiner*—John S. Heyman
*Attorney*—Arnold Robinson

[57] ABSTRACT

An automatic process control system transfer function device has a substantially linear small signal response which falls away at large signal inputs. The device comprises a square wave oscillator of which the mark-space ratio is varied by one or more nonlinear elements. These elements can be transistors used as resistors and which can be driven into saturation.

8 Claims, 2 Drawing Figures

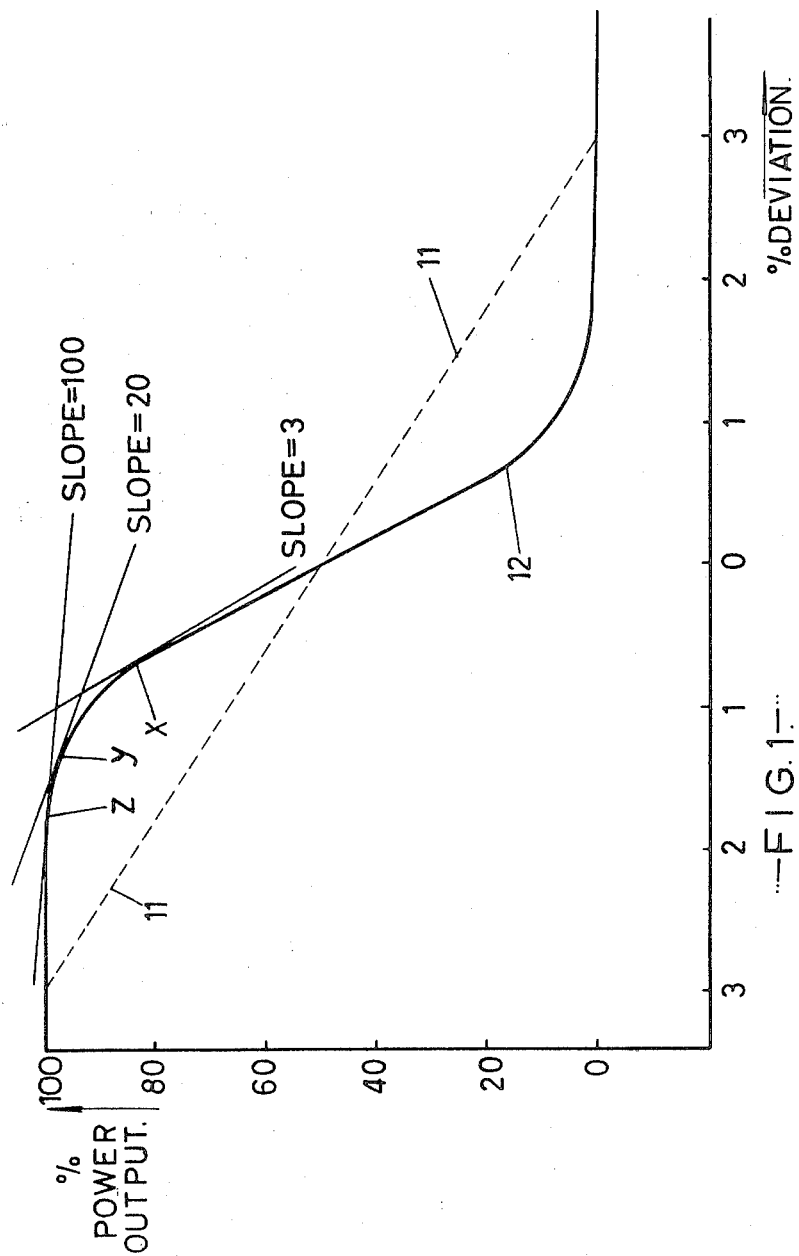

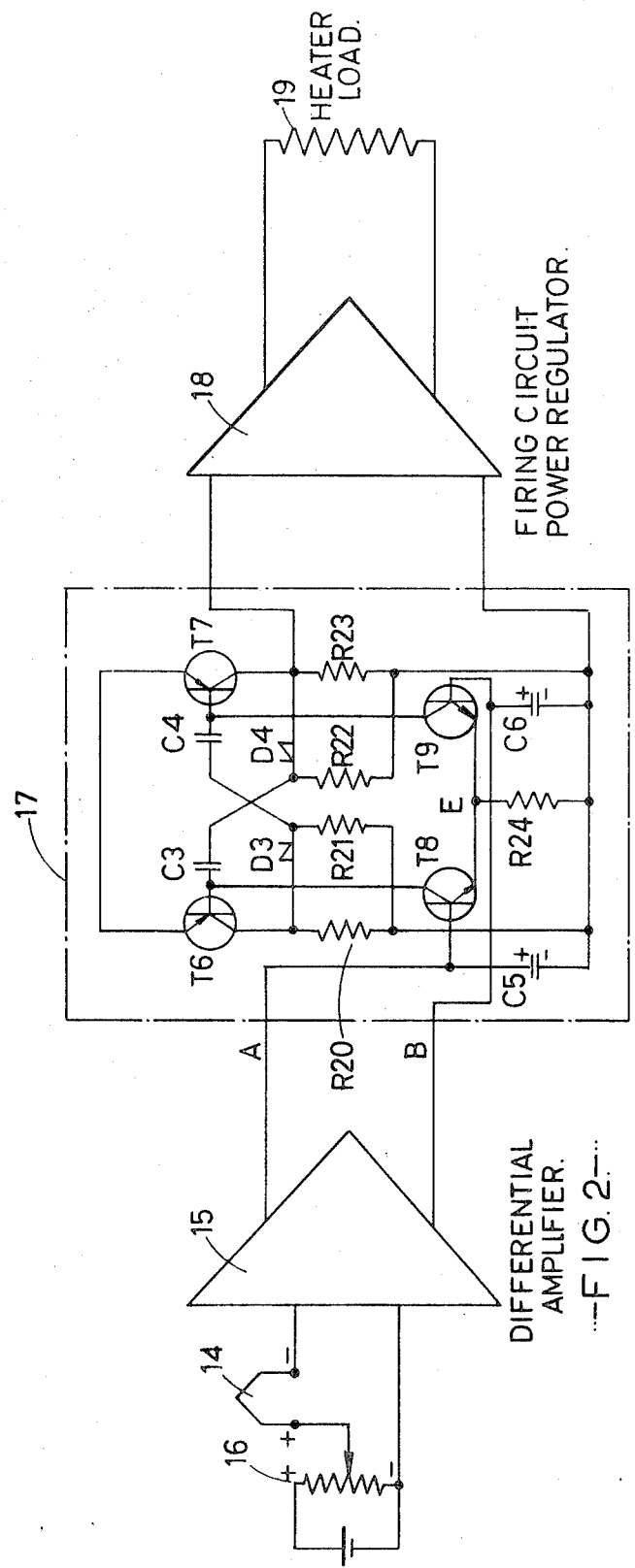
-FIG. 2-

AUTOMATIC PROCESS CONTROL SYSTEMS

The present invention relates to automatic process control systems.

In automatic control systems, where a variable parameter is required to be controlled to maintain a desired value, it is common to measure any deviation of the parameter from the chosen value and apply an opposing correcting force whose magnitude is proportional to the amount of deviation. This is called proportional mode and hitherto it has been general practice to use a linear relationship between the deviation and correcting forces. An inherent disadvantage with proportional mode control is that for every different value of the correcting force there is an equivalent value of deviation and in general it is axiomatic that deviation must exist before a maintaining or correcting force can exist. The deviation between actual and desired values of the controlled parameter also varies with the different forces necessary to sustain control at specific chosen levels from minimum to maximum.

To remove the effect of this unwanted deviation or offset, second and third modes of control are often superimposed on the proportional mode. Reset mode can be introduced to counteract offset but this correction can increase instability of the control system especially at starting times and although only one value can be chosen for reset it is desirable to have a different value for each set of conditions surrounding the controlled parameter. A third control mode correction responsive to the rate of change of deviation with time is used to stabilize the system against sudden changes and oscillatory tendencies introduced by external factors or by the reset mode action. Again only one value can, in practice, be selected for the rate mode whereas to cover all possibilities a wide range of values are required.

In the choice of the proportional band there are two conflicting requirements. For stability, and to prevent excessive overshoot of the controlled parameter at startup, a wide proportional band is needed. When a process is under steady state conditions and control is at desired point, it is better to use a much narrower proportional band. This ensures a more sensitive control and since offset must remain within the proportional band there is reduced offset with a narrow band.

In order to simplify the control means and to rationalize some of the compromises incurred with the three term mode of control a modified form of nonlinear proportion mode has been found effective. The nonlinear response characteristic gives reduced offset and improved stability resulting in a widely adjustable stable control that is more accurate than other simple devices and giving a performance similar to sophisticated three term controllers but at much less cost and complication.

According to the present invention an error-actuated automatic process controller is provided with a transfer function, relating measured error to system output energy, which is substantially linear but declines progressively for large values of error.

The energy transfer function generator of the present invention may consist of an electronic square wave oscillator. Conveniently in one form this ca- be multivibrator which is characterized in that the elements determining the mark-space ratio are varied in a specific nonlinear manner relating controller measured error and mark-space ratio. The relationship is linear for small and medium errors but with large errors a progressively reducing rate of markspace ratio variation occurs, introducing the nonlinear portion of the transfer characteristic which gives the process controller its reduced offset and increased stability under large deviation conditions.

By "small errors" is meant the expected deviations from a set point during normal operations. By "large errors" is meant a greater deviation than normal, e.g., during starting or following a strong disturbance.

The multivibrator conveniently has two active elements interconnected by a network determining the mark-space ratio of the vibrator, said network being regulatable in dependence on the input by a pair of variable resistance transistors operable in opposition so that the change in mark-space ratio for small signals is linear but declines progressively for large signals.

The network preferably includes a long-tailed pair of transistors which are connected to the input or inputs so that the resistance of one is increased by the input and the resistance of the other decreased, the arrangement being such that one or other, depending on the polarity of the inputs, of the long-tailed pair is driven into saturation by large input signals before the remaining one is totally cutoff.

One embodiment of the present invention will now be described, by way of example, with reference to the accompanying drawings in which:

FIG. 1 is a graph showing, by way of example, a deviation dependent sensitivity transfer function consistent with the present invention, and FIG. 2 is a circuit diagram of a temperature control system.

In the graph of FIG. 1 the shape of a conventional linear proportional control transfer function relating parameter control force, i.e., output, against deviation between desired and actual values is shown by a curve 11, while the equivalent nonlinear transfer function is shown by a curve 12. With the linear characteristic curve 11, a given change in deviation around the control or zero-error point gives a constant variation in percentage output and the slope of the curve is constant within the limits of the output extremes. With the nonlinear function, curve 12, however, the slope of the curve is constant over the middle section but at both ends tapers away to give a progressively increasing effective proportional band which tends towards infinity for large deviations at the edges of the control band; in other words the curve gives progressively smaller increments for equal steps of error as the error increases. The shape of the curve is almost linear over the central 80 percent of its travel with the extreme plus or minus 10 percent turning into an exponential form.

The effective proportional band at the point $x$ is 3 percent, at the point $y$ it is 20 percent and at the point $z$ it is over 100 percent. Resulting from this, on any particular control application, the deviation dependent sensitivity gives the stabilizing benefits of a wide proportional band (e.g., at startup or following a strong disturbance) combined with the reduced offset and accurate control associated with a narrow proportional band as the desired control point is approached.

It will be appreciated that the present invention is applicable to the control of pressure, flow, movement, position, temperature or any other measurable variable which can be expressed or translated by well-known transducing media. Furthermore the principles of the invention apply equally to electrical, mechanical, pneumatic or hydraulic control means as the correcting force.

One practical embodiment of the present invention, for example as illustrated in the circuit diagram of FIG. 2 is in temperature control by way of an electronic controller with a thermocouple sensor 14, a differential means 15 for comparing the output of the sensor with a preset datum provided by a potentiometer 16 to derive an error signal, and a thyristor output control. These features are secondary to the transfer function generator means 17 used to relate input error deviation in the characterized form to output energy controlling the process concerned as shown by the curve 12 in FIG. 1.

Referring to the circuit diagram of FIG. 2, the control is performed by the characterization or central function generator means thereof, which constitutes the transfer function generating section of the system. To the left is a typical conventional thermocouple measurement and comparison means 14, 15, 16. This is shown schematically but could comprise a bridge circuit with cold junction compensation followed by a double differential DC amplifier including a common mode rejection feedback stage. The output of this amplifier is a DC differential signal of magnitude proportional to the deviation or error between actual and desired temperature. Transistors T6 and T7 form a multivibrator with cross connections consisting of capacitors C3, C4, diodes D3, D4, resistors R21, R22 and with collector loads R20 and R23.

In this invention transistors T8 and T9 are used as variable resistances between their emitter and collector termination in such a manner that increasing base voltage on a transistor causes it to carry more current from emitter to collector; hence its effective resistance decreases. Transistors T8 and T9 can therefore be regarded as voltage dependent resistors. These transistors T8, T9 and associated circuit elements C5, C6 and R24 control the performance of the multivibrator. Assuming firstly that the differential input signal between A & B is zero it will be seen that transistors T8 and T9 will be carrying equal currents and their effective resistances between emitters and collectors, will be equal and the multivibrator will run with unity mark-space ratio. When the voltage at A increases then B decreases and consequently the resistance of transistor T8 falls whilst that of transistor T9 rises and the mark-space ratio of multivibrator changes. Further increase in the voltage at A continues this process until transistor T8 is fully conducting to saturation limits and its resistance reaches a minimum value.

Still further increases in the voltage at A is now passed directly through to the emitter of transistor T9 (also at point E to transistor T8 emitter) in the manner of an emitter follower. At this turning point in the circuit action transistor T8 is fully conducting but transistor T9 is not yet fully "off" although the current in transistor T9 is very low and typically is less than 10 percent of the total current of the pair of transistors T8/T9.

Due to the differential nature of the input at A & B, while A is increasing B is decreasing so there is a decreasing voltage applied to the base of transistor T9. Together with the transferred increase to the emitters, after saturation of transistor T8, it will be seen that the application of diverging voltages on the base/emitter of transistor T9 is now occuring at a faster rate. Thus after saturation of transistor T8 the resistance of transistor T9 rises at an increased rate with respect to increases in differential voltage input between A & B.

Alternatively it can be considered that before saturation of transistor T8 the voltage at point E remains essentially constant since a rise current through transistor T8 is accompanied by a similar fall in current through transistor T9. After saturation this current balance is lost and the rate of change of current in the residual conducting transistor is increased owing to the voltage of point E moving in sympathy with one side of the differential input voltage A/B.

An equal and opposite effect is created when the voltage at B is rising with respect to A and in this case the transistor T9 saturates first followed by an increased rate cutoff by the transistor T8.

The effect of these nonlinear changes on the multivibrator is to change the mark-space ratio to give an average mark level corresponding to the power ordinate of the curve 12 of FIG. 1. In the remaining portion of the circuit of FIG. 2, the mark-space ratio of the multivibrator is translated into useful output power via a zero voltage switched thyristor power stage 18 which feeds the load 19. The overall effect is to give the controller a highly sensitive action, namely that of a narrow proportional band, at or near the desired control point, i.e., at zero deviation. The natural offset is thus reduced to a very low level. As deviation increases, in either direction, the control action sensitivity is reduced, equivalent to increasing proportional band, which increases the stability of the system when large external disturbances occur, such as at starting. Thus overswing is reduced and the controller exhibits a high degree of stability at all power levels and following large disturbances.

It is found that the logarithmic reduction in power at the extremes of the proportional band can give a tapering effect resulting in power turndown ratios lower than 1 part in 2,000. This ability to give very low-controlled powers allows the controller to operate well at much lower temperatures than conventional controllers which typically are unable to exceed controlled power turndown ratios of 1 part in 30 or thereabouts.

Thus basically the present invention, utilizing mechanical, electrical, hydraulic or pneumatic means, enables a parameter to be controlled with reduced offset, increased stability and over wide power ranges using a transfer characteristic of power against deviation which is linear for small variations but which tends exponentially into an infinite proportional control band at adjustable larger values of deviation.

In the foregoing, the invention has been described in reference to a specific illustrative and exemplary device. It will be evident that variations and modifications, as well as the substitution of equivalent parts or devices for those shown, may be made without departing from the broader scope and spirit of the invention.

I claim:

1. An error actuated automatic process controller comprising a condition sensor, differential means operative to compare the output of said sensor with a preset datum and to yield an error signal, and transfer function generator means operative to generate a function of the error signal for use in controlling the condition, which function is substantially linear over a predetermined normal range of errors but gives progressively smaller increments for equal steps of error as the error increases beyond said predetermined normal range.

2. A controller according to claim 1 wherein the generator comprises a square wave oscillator, the mark-space ratio of which is variable with an input, which is the error signal.

3. A controller according to claim 2 wherein the square wave oscillator incorporates at least one nonlinear element which controls the mark-space ratio.

4. A controller according to claim 3 wherein each of the at least one nonlinear elements is a three terminal device.

5. A controller according to claim 4 wherein the or each three-terminal device is transistor operated as a resistor, the value of which is varied by the error signal input.

6. A controller according to claim 2 wherein the generator is a free-running multivibrator consisting of two active elements interconnected by a network determining the mark-space ratio and including a long-tailed pair of transistors controlled by signals of opposite polarity from the differential means so that the resistance of one is increased as that of the other is decreased.

7. A controller according to claim 6 wherein the arrangement is such that the respective one of the long-tailed pair will be saturated before the other is rendered nonconductive.

8. A controller according to claim 1 wherein said transfer function generator comprises a two-stage free-running multivibrator circuit having first and second time constant circuits each comprising a capacitance and a transistor, the collector-emitter paths of the two transistors of said time constant circuits each being connected in series with a common resistance.

* * * * *